United States Patent
O Brien

(10) Patent No.: US 10,407,204 B2
(45) Date of Patent: Sep. 10, 2019

(54) GARNISH TRAY

(71) Applicant: Kevin Michael O Brien, Fairfield, CT (US)

(72) Inventor: Kevin Michael O Brien, Fairfield, CT (US)

(73) Assignee: Kevin O'Brien, North Kingstown, RI (US)

( * ) Notice: Subject to any disclaimer, the term of this patent is extended or adjusted under 35 U.S.C. 154(b) by 307 days.

(21) Appl. No.: 14/545,576

(22) Filed: May 26, 2015

(65) Prior Publication Data

US 2016/0345764 A1   Dec. 1, 2016

(51) Int. Cl.
*B65D 1/36* (2006.01)
*B65D 81/22* (2006.01)
*A47J 47/14* (2006.01)

(52) U.S. Cl.
CPC .............. *B65D 1/36* (2013.01); *A47J 47/14* (2013.01); *B65D 81/22* (2013.01)

(58) Field of Classification Search
CPC .............................. A47G 23/0641; B65D 1/36
USPC .................... 220/513; 426/108, 112, 115
See application file for complete search history.

(56) References Cited

U.S. PATENT DOCUMENTS

| | | | | |
|---|---|---|---|---|
| 2,922,541 A | * | 1/1960 | Martelli | B65D 1/36 206/521.1 |
| D190,839 S | * | 7/1961 | Voigtmann | D15/90 |
| 3,074,582 A | * | 1/1963 | Martelli et al. | B65D 1/36 206/521.1 |
| D202,529 S | * | 10/1965 | Rosebrook | D15/90 |
| 3,306,484 A | * | 2/1967 | Padovani | B65D 1/36 206/521.1 |
| 4,286,715 A | * | 9/1981 | Martelli | B65D 85/34 206/564 |
| 4,967,995 A | * | 11/1990 | Burgess | F25C 1/24 220/350 |
| D326,749 S | * | 6/1992 | Apps | D3/311 |
| 6,168,131 B1 | * | 1/2001 | Tabatabaie | F25C 1/24 249/119 |
| 6,296,120 B1 | * | 10/2001 | Danko | B65D 5/503 206/564 |
| 6,899,249 B2 | * | 5/2005 | Sanders | B65D 81/261 220/606 |
| D586,830 S | * | 2/2009 | de Groote | D15/90 |
| 2016/0242576 A1 | * | 8/2016 | Babcock | A47F 10/06 |

FOREIGN PATENT DOCUMENTS

FR   2368674 A1 *  5/1978 ............... F25C 1/24

* cited by examiner

*Primary Examiner* — Joshua T Kennedy
(74) *Attorney, Agent, or Firm* — Peter Hagerty

(57) ABSTRACT

A garnish tray for whole garnish includes a plurality of wells having an opening at one end defined by sidewalls extending from a top surface to a bottom surface to define a well depth; and a plurality of channels extending between adjacent wells, wherein the plurality of channels extend from the top surface to a channel depth equal to or less than the well depth. Also disclosed are processes for serving the whole garnish.

7 Claims, 1 Drawing Sheet

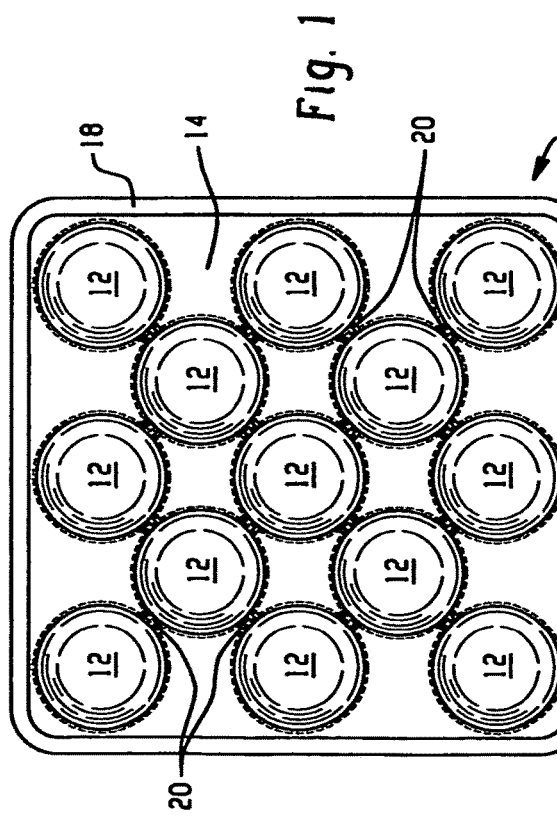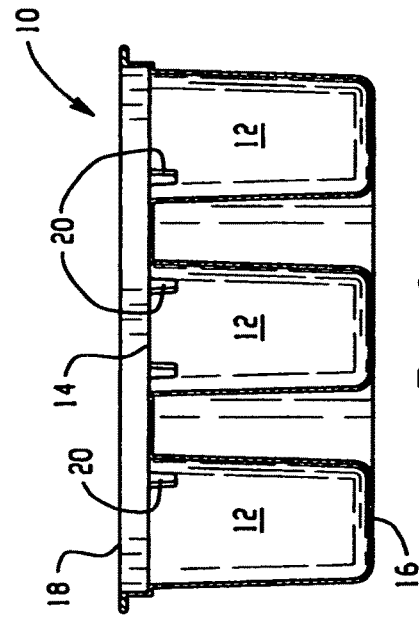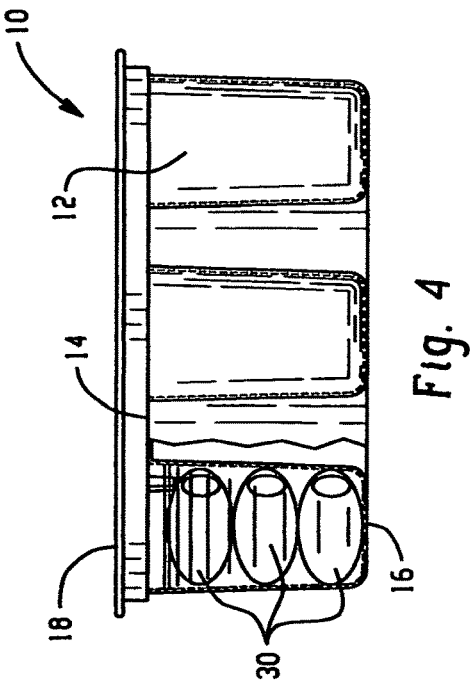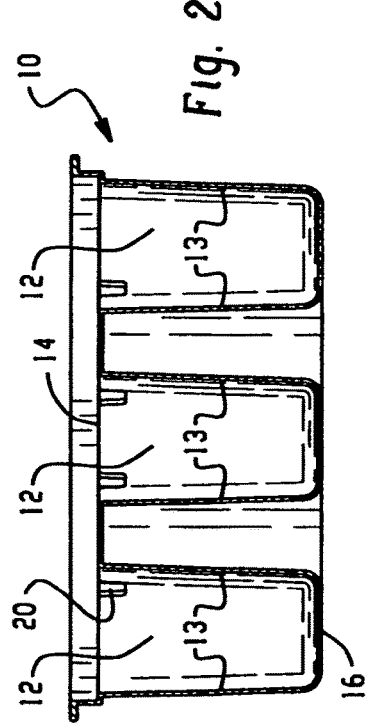

GARNISH TRAY

CROSS REFERENCE TO RELATED APPLICATIONS

The present application claims the benefit of U.S. Provisional Application No. 61/997,025, filed on May 20, 2014 and incorporated herein by reference in its entirety.

BACKGROUND

The present disclosure generally relates to a garnish tray for storing stackedly arranged pieces of whole garnish, such as a cherry, an onion or an olive, in a solution for subsequent use in a beverage.

Many cocktail formulas include some form of whole garnish; most notably, olives and/or onions for martinis, and cherries for manhattans. In order to secure such garnishes to decorate a cocktail, a toothpick or spear is often utilized, wherein the spear passes through the garnish, retaining the garnish thereupon.

Since such garnishes are placed in drinks and/or subsequently eaten, hygiene of the garnish is of great importance. Unfortunately, typical methods of packaging garnishes militate against maintaining the garnishes in hygienic condition. That is, since such garnishes are typically packaged in large quantities, often in glass or plastic containers, the drink preparer must fish or pluck the garnish from the container; thus, requiring the use of an implement or, as is often the case, fingers. Accordingly, after the first garnish is extracted from its container via potentially germ-laden fingers, the remaining garnishes, and/or pickling liquid in which such garnishes are often kept, are in less than sanitary condition.

Contamination of such garnishes is further particularly notable in a tavern atmosphere, where garnishes are typically left out in the open, often on a partitioned tray or basket, and unprotected from spills, drips and/or exhaust breath of patrons and bartenders.

Exposure of garnishes to open air is also detrimental to the maintenance of garnish freshness. Although garnishes are often pickled in some fashion, garnishes will still lose freshness over time unless retained in constant fluid surroundings.

BRIEF SUMMARY

Disclosed herein is a garnish tray and processes for serving a whole garnish. The garnish tray includes a plurality of wells having an opening at one end defined by sidewalls extending from a top surface to a bottom surface to define a well depth; and a plurality of channels extending between adjacent wells, wherein the plurality of channels extend from the top surface to a channel depth equal to or less than the well depth.

The process of serving whole garnish includes placing a plurality of whole garnish and a solution onto a garnish tray, wherein the garnish tray comprises a plurality of wells having an opening at one end defined by sidewalls extending from a top surface to a bottom surface to define a well depth; and a plurality of channels extending between adjacent wells, wherein the plurality of channels extend from the top surface to a channel depth equal to or less than the well depth; and maneuvering the whole garnish into selected ones of the plurality of wells, wherein each one of the plurality of wells is configured to stackedly maintain multiple whole garnish and a portion of the solution.

The disclosure may be understood more readily by reference to the following detailed description of the various features of the disclosure and the examples included therein.

BRIEF DESCRIPTION OF THE DRAWINGS

Referring now to the figures wherein the like elements are numbered alike:

FIG. 1 ("FIG.") is a plan view of a garnish tray in accordance with the present disclosure;

FIG. 2 is a side perspective view of a garnish tray of FIG. 1;

FIG. 3 is an end-on perspective view of a garnish tray of FIG. 1; and

FIG. 4 is a side sectional view of an exemplary garnish tray including stackedly arranged olives disposed therein.

DETAILED DESCRIPTION

Referring now to FIGS. 1-3, there is depicted a garnish tray 10 in accordance with the present disclosure. The garnish tray 10 includes a plurality of wells 12 defined by sidewalls 13 extending from a top surface 14 to a bottom surface 16. The wells 12 are generally cylindrically shaped and may be tapered such that the opening at the top surface is greater than a diameter at the bottom surface. The wells are configured to stackedly arrange a desired amount of whole garnish in a solution until use. As used herein, whole garnish is intended to refer to the garnish in its entirety as it is naturally grown, e.g., cherries, onions, olives, and the like. Whole garnish is intended to exclude sliced varieties of garnish such as limes, lemons, oranges, and the like.

Each well 12 can be dimensioned such that a stacked arrangement of a desired amount of the whole garnish can be achieved as may be desired in some applications. For example, each well can be configured to contain two or three stackedly arranged olives of a particular size. By stackedly maintaining the whole garnish in individual wells, a server can easily spear a toothpick or the like into the garnish without physically touching the whole garnish. Moreover, each well can carry the solution or brine in which the particular whole garnish was originally packed or any desired solution.

A raised lip 18 relative to the top surface 14 circumscribes a perimeter of the garnish tray 10 so as to prevent juices from flowing out of the tray and/or into the tray from adjacent garnish trays. For example, in some embodiments, the garnish tray of the present disclosure may be utilized in combination with a conventional elongated partitioned tray that is configured to seat multiple garnish trays having different types of garnish, e.g., lime slices, orange slices, and the like. In this manner, contamination of juice or solution from and into the garnish tray of the present disclosure can be minimized or substantially prevented.

The garnish tray further includes fluid channels 20 from one well to an adjacent well, wherein each channel 20 extends from the top surface 14 to a depth equal to or less than an overall height of the well so as to maintain a constant amount of fluid within the different wells. In one embodiment, the channel depth corresponds to about 50% of the well depth, in other embodiments, the channel depth corresponds correspond to about 25% of the well depth; and in still other embodiments, the channel depth corresponds to about 10% of the well depth. Consequently, the whole garnish stackedly arranged and carried in the garnish tray can be maintained in its packing juices or the like so to prevent the garnish from drying out or losing its freshness.

Moreover, when the channel depth is a fraction of the well depth, the fluid will be at a minimum level even when some of the stackedly arranged whole garnish is selectively removed from only a portion of the wells.

As shown more clearly in FIG. 1, the wells 12 are depicted in a staggered relationship, which includes three columns ($C_1$) that include three wells, and two columns ($C_2$) of two wells intermediate the three rows, which are offset from the adjacent column of wells. The staggered relationship generally maximizes the number of wells per unit area. It should be apparent in view of the present disclosure, that more or less rows can be utilized. Likewise, it should be apparent that the wells can be arranged in different configurations as may be desired for different shape garnish trays, e.g., circular, square, rectangular or any other geometric shape. For example, the wells may be non-staggered, radially configured, and the like. The particular configuration is not intended to be limited.

The garnish tray can be manufactured from metals, plastics, and the like.

In operation, a server pours or utilizes a utensil such as a spoon or the like to place the whole garnish from a packaging container e.g., a jar holding olives in brine, onto the top surface of the garnish tray. The server then uses the same utensil to maneuver the whole garnish into the various wells. Any excess brine inn the garnish tray may be returned to the original packaging or discarded. Likewise, additional brine may be added such that each well has sufficient brine to submerge the olive completely and also to provide sufficient fluid within the channel so as to provide fluid communication between the different wells. For example, as shown in FIG. 4, the garnish tray may include wells having a dimension sufficient to accommodate three olives 30, which can be easily maneuvered without human contact into the respective well until capacity is reached. A toothpick or spear may then be easily inserted through the stack of three olives, wherein the stacked olives are maintained in their brine until use in a beverage, for example. Advantageously, the garnish tray eliminates direct contact from the server and also provides ease in spearing multiple pieces of garnish without physical contact by the server. Moreover, the garnish tray can be dimensioned to be seated within existing partitioned trays, if desired.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A single-piece garnish tray for whole garnish comprising:
   a plurality of cylindrically shaped wells having an opening at one end defined by sidewalls of a uniform height extending from a top surface to a bottom surface to define a well depth configured to contain multiple pieces of stackedly arranged whole garnish in a single column;
   a plurality of channels extending between adjacent wells, wherein the plurality of channels extend from the top surface to a channel depth equal to or less than the well depth, wherein the channel depth is less than 50% of the well depth to 10% of the well depth, and wherein each adjacent well of the plurality of wells is fluidly connected to another adjacent well by a single one of the plurality of channels,
   wherein the plurality of wells is arranged in offset rows within the single-piece garnish tray such that interiorly arranged ones of the plurality of wells consist of four channels located at 90 degrees from each other about the circumference of the well openings, each extending to a different adjacent well.

2. The garnish tray of claim 1, further comprising a raised lip circumscribing a perimeter of the top surface.

3. The garnish tray of claim 1, wherein the cylindrically shaped wells are tapered and have a greater diameter at the top surface than the bottom surface.

4. The garnish tray of claim 1, wherein the channel depth is less than 50% of the well depth to 25% of the well depth.

5. The garnish tray of claim 1, wherein the channel depth is less than 25% of the well depth to 10% of the well depth.

6. The garnish tray of claim 1, wherein the plurality of wells are arranged in five columns, wherein the five columns comprise three columns of three wells and two columns of two wells, wherein the two columns of two wells are intermediate the three columns of three wells.

7. The garnish tray of claim 1, wherein the whole garnish comprises cherries, olives, or onions.

* * * * *